(12) United States Patent
Braun et al.

(10) Patent No.: US 7,386,496 B1
(45) Date of Patent: Jun. 10, 2008

(54) SYSTEM AND METHOD FOR EVALUATING REAL ESTATE FINANCING STRUCTURES

(75) Inventors: William J. Braun, Evanston, IL (US); Robert Dmytryk, San Diego, CA (US)

(73) Assignee: Jones Lang LaSalle IP, Inc., Chicago, IL (US)

( * ) Notice: Subject to any disclaimer, the term of this patent is extended or adjusted under 35 U.S.C. 154(b) by 623 days.

(21) Appl. No.: 09/930,913

(22) Filed: Aug. 15, 2001

(51) Int. Cl.
*G06Q 40/00* (2006.01)

(52) U.S. Cl. .......................... 705/36; 705/35; 705/37; 705/38; 705/7; 705/8; 705/10

(58) Field of Classification Search .................... 705/1, 705/7, 8, 10, 35–38
See application file for complete search history.

(56) References Cited

U.S. PATENT DOCUMENTS

| | | | |
|---|---|---|---|
| 5,414,621 A * | 5/1995 | Hough | 705/10 |
| 5,680,305 A | 10/1997 | Apgar, IV | |
| 5,689,650 A * | 11/1997 | McClelland et al. | 705/36 |
| 5,806,049 A | 9/1998 | Petruzzi | |
| 5,812,987 A | 9/1998 | Luskin et al. | |
| 5,812,988 A | 9/1998 | Sandretto | |
| 5,819,238 A | 10/1998 | Fernholz | |
| 5,857,174 A | 1/1999 | Dugan | |
| 5,870,721 A * | 2/1999 | Norris | 705/38 |
| 5,884,287 A | 3/1999 | Edesess | |
| 5,911,136 A | 6/1999 | Atkins | |
| 5,918,217 A | 6/1999 | Maggioncalda et al. | |
| 5,930,775 A | 7/1999 | McCauley et al. | |
| 6,012,043 A | 1/2000 | Albright et al. | |
| 6,055,517 A | 4/2000 | Friend et al. | |
| 6,070,151 A | 5/2000 | Frankel | |
| 6,078,904 A | 6/2000 | Rebane | |
| 6,192,347 B1 | 2/2001 | Graff | |
| 6,219,650 B1 | 4/2001 | Friend et al. | |
| 6,675,149 B1 * | 1/2004 | Ruffin et al. | 705/8 |
| 2004/0148211 A1 * | 7/2004 | Honarvar et al. | 705/7 |

OTHER PUBLICATIONS

Fannie Mae Form 1003, Rev. Oct. 1992 "Uniform Residential Loan Application".*
"Using mortgage credit to achieve client objectives", Storms, Phillip. Journal of Financial; Planning. Denver: Oct. 1996.vol. 9, Iss. 5; p. 77, 9 pgs; ISSN/ISBN: 10403981; ProQuest document ID: 10342462; Document URL: http://proquest.umi.com/pqdweb?did=103.*
Julian R. Franks et al. "Valuation of Financail Lease Contracts"; The Journal of Finance, vol. 33, No. 2 (May 1978), pp. 657-669 (hereinafter Franks).*
Dan Emerson "Buy or lease of something in between"; Plants, Sites and Parks. New York: Feb./Mar. 1999.vol. 26, Iss. 1; p. 47, 4.*

* cited by examiner

*Primary Examiner*—Harish T. Dass
(74) *Attorney, Agent, or Firm*—McDermott Will & Emery LLP

(57) ABSTRACT

The present invention relates to a system and a method for evaluating real estate financial structures. Specifically, the present invention provides a method for determining an optimal financial structure for controlling real estate assets. A user enters information into the system that relates to one or a plurality of real estate assets. The system analyzes the inputted information and rates various financing structures that may be used for the control of the real estate assets, including, for example, whether an individual or entity should own, lease, or control the asset via another financing structure.

18 Claims, 9 Drawing Sheets

*Fig. 6A*

SCORING MATRIX - QUANTITATIVE FACTORS
BASE MODEL: "NEW ACQUISITION"
REAL ESTATE SOLUTION - LEASE VS. BUY ANALYSIS
SCORING MATRIX - FINANCIAL

| | WEIGHTING | OWNERSHIP - DEBT SCORE | WTD. SCORE | SYNTHETIC LEASE SCORE | WTD. SCORE | LEASE SCORE | WTD. SCORE |
|---|---|---|---|---|---|---|---|
| FINANCIAL | | | | | | | |
| 1 NET PRESENT VALUE AFTER TAX | 50% | 3 | 1.50 | 2 | 1.00 | 1 | 0.50 |
| 2 ECONOMIC VALUE-ADDED (EVA) | 10% | 3 | 0.30 | 2 | 0.20 | 1 | 0.10 |
| 3 BALANCE SHEET IMPACT: | | | | | | | |
| TOTAL DEBT TO CAPITAL | | 1 | | 1 | | 1 | |
| CAPITAL REQUIREMENT | | 1 | | 2 | | 2 | |
| AVERAGE / WEIGHTED AVERAGE | 5% | 1 | 0.05 | 1.5 | 0.08 | 1.5 | 0.08 |
| 4 P&L COST IMPACT: | | | | | | | |
| 1ST YEAR IMPACT ON EARNINGS (LOSS) FROM CONTINUING OPERATIONS | | 2 | | 3 | | | |
| 12 YEAR CUMULATIVE IMPACT ON EARNINGS (LOSS) FROM CONTINUING OPERATIONS | | 3 | | 2 | | | |
| AVERAGE / WEIGHTED AVERAGE | 15% | 2.5 | 0.38 | 2.5 | 0.38 | 1 | 0.15 |
| 5 CREDIT RISK: | | | | | | | |
| EBIT INTEREST COVERAGE | | 3 | | 2 | | 1 | |
| EBITDA INTEREST COVERAGE | | 3 | | 2 | | 1 | |
| FREE CASH FLOWS TO TOTAL DEBT | | 3 | | 2 | | 1 | |
| FUNDS FROM OPERATIONS TO TOTAL DEBT | | 3 | | 2 | | 1 | |
| AVERAGE / WEIGHTED AVERAGE | 15% | 3 | 0.45 | 2 | 0.30 | 1 | 0.15 |
| 6 PROFITIBILITY RATIOS: | | | | | | | |
| DILUTED EPS FROM CONT. OPER. | | 2 | | 3 | | 1 | |
| OPERATING PROFIT/NET SALES | | 3 | | 2 | | 1 | |
| RETURN ON ASSETS | | 2 | | 3 | | 1 | |
| RETURN ON EQUITY | | 2 | | 3 | | 1 | |
| RETURN ON TOTAL CAPITAL | | 2 | | 3 | | 1 | |
| AVERAGE / WEIGHTED AVERAGE | 5% | 2.2 | 0.11 | 2.8 | 0.14 | 1 | 0.05 |
| TOTALS | 100% | | 2.79 | | 2.09 | | 1.03 |

Fig. 6B

SCORING MATRIX - QUALITATIVE FACTORS (RAW SCORES)
BASE MODEL: "NEW ACQUISITION"
REAL ESTATE SOLUTION - LEASE VS. BUY ANALYSIS
NON-FINANCIAL INPUT

| CRITERIA | DETERMINANT | SCORE | | OWNERSHIP DEBT | | | SYNTHETIC LEASE | | | LEASE | | |
|---|---|---|---|---|---|---|---|---|---|---|---|---|
| 7 STRATEGIC IMPORTANCE | DEGREE CRITICAL TO BUSINESS | CORE | NON-CORE | | CORE 3 | NON-CORE | | CORE 3 | NON-CORE | | CORE 1 |
| 8 PROPERTY CHARACTERISTICS | | | | | | | | | | | | |
| FACILITY SIZE | SQUARE FEET | LARGE | SMALL | MEDIUM | LARGE 3 | SMALL | MEDIUM 2 | LARGE | SMALL | MEDIUM | LARGE 1 |
| REPLACEMENT COST | TOTAL REPLACEMENT COST | MEDIUM | LOW | MEDIUM 2 | HIGH | LOW | MEDIUM 2 | HIGH | LOW | MEDIUM 2 | HIGH |
| DEGREE ENTITY SPECIFIC | TI'S % OF BUILDING COST | 20% - 50% | <20% | 20%-50% 2 | >50% | <20% | 20%-50% 2 | >50% | <20% | 20%-50% 2 | >50% |
| MARKET VALUE/BOOK VALUE | MARKET VALUE/REPLACE COST | >100% | >100% 1 | 75-100% | <75% | >100% 3 | 75-100% | <75% | >100% 3 | 75-100% | <75% |
| 9 OCCUPANCY ISSUES: | | | | | | | | | | | | |
| LENGTH OF COMMITMENT | TERM IN YEAR | 10> | <5 | 5-9 | 10> 3 | <5 | 5-9 | 10> 1 | <5 | 5-9 2 | 10> |
| CERTAINTY OF OCCUPANCY | LEVEL OF CERTAINTY | MEDIUM | LOW | MEDIUM 2 | HIGH | LOW | MEDIUM 2 | HIGH | LOW | MEDIUM 2 | HIGH |
| FLEXIBILITY: | | | | | | | | | | | | |
| CONTROL OF ENVIRONMENT | LEVEL OF IMPORTANCE | <IMPORTANT | NOT CRITICAL 1 | <IMPORTANT | IMPORTANT | NOT CRITICAL | <IMPORTANT 2 | IMPORTANT | NOT CRITICAL | <IMPORTANT 2 | IMPORTANT |
| 10 MARKET ISSUES | | | | | | | | | | | | |
| LIQUIDITY: | | | | | | | | | | | | |
| VALUE RETENTION: | MARKET CONFORMANCE | HIGH | HIGH | MEDIUM 2 | LOW | HIGH 3 | MEDIUM | LOW | HIGH 3 | MEDIUM | LOW |
| EASE OF DISPOSITION: | SIZE OF MARKET | PRIMARY | PRIMARY 3 | SECONDARY | TERTIARY | PRIMARY 3 | SECONDARY | TERTIARY | PRIMARY 3 | SECONDARY | TERTIARY |
| | QUALITY OF MARKET | EQUILIBRIUM | OVERSUPPLY | EQUILIBRIUM 2 | UNDERSUPPLY | OVERSUPPLY | EQUILIBRIUM 2 | UNDERSUPPLY | OVERSUPPLY | EQUILIBRIUM 2 | UNDERSUPPLY |
| | RENT/VALUE TRENDS | DOWN | DOWN 1 | FLAT | UP | DOWN 1 | FLAT | UP | DOWN 1 | FLAT | UP |
| | ENTITY % OF REGION | <50% | >80% | 50% - 80% 2 | <50% | >80% | 50% - 80% 2 | <50% | >80% | 50% - 80% 2 | <50% |
| TOTAL SCORE | | | | 28 | | | 30 | | | 26 | | |

SCORING MATRIX - QUALITATIVE FACTORS (WEIGHTED SCORES)

BASE MODEL: "NEW ACQUISITION"
REAL ESTATE SOLUTION - LEASE VS. BUY ANALYSIS
SCORING MATRIX - NON FINANCIAL

| CRITERIA | WEIGHTING | OWNERSHIP - DEBT | | SYNTHETIC LEASE | | LEASE | |
|---|---|---|---|---|---|---|---|
| | | SCORE | WTD. SCORE | SCORE | WTD. SCORE | SCORE | WTD. SCORE |
| NON-FINANCIAL | | | | | | | |
| 7 STRATEGIC IMPORTANCE | 15% | 3 | 0.45 | 3 | 0.45 | 1 | 0.15 |
| 8 PROPERTY CHARACTERISTICS | | | | | | | |
|    FACILITY SIZE | | 3 | | 3 | | 1 | |
|    REPLACEMENT COST | | 2 | | 2 | | 2 | |
|    DEGREE ENTITY SPECIFIC | | 2 | | 2 | | 2 | |
|    MARKET VALUE/BOOK VALUE | | 1 | | 3 | | 3 | |
| AVERAGE / WEIGHTED AVERAGE | 23.0% | 2.0 | 0.46 | 2.5 | 0.58 | 2.0 | 0.46 |
| 9 OCCUPANCY ISSUES: | | | | | | | |
|    LENGTH OF COMMITTMENT | | 3 | | 1 | | 1 | |
|    CERTAINTY OF OCCUPANCY | | 2 | | 2 | | 2 | |
|    FLEXIBILITY: | | | | | | | |
|    CONTROL OF ENVIRONMENT | | 2 | | 2 | | 2 | |
| AVERAGE / WEIGHTED AVERAGE | 30.0% | 2.3 | 0.70 | 1.7 | 0.50 | 1.7 | 0.50 |
| 10 MARKET ISSUES: | | | | | | | |
|    LIQUIDITY: | | | | | | | |
|    VALUE RETENTION: | | | | | | | |
|    MARKET CONFORMANCE | | 1 | | 3 | | 3 | |
|    EASE OF DISPOSITION: | | | | | | | |
|    SIZE OF MARKET | | 3 | | 3 | | 3 | |
|    QUALITY OF MARKET | | 2 | | 2 | | 2 | |
|    RENT/VALUE TRENDS | | 1 | | 1 | | 3 | |
|    ENTITY % OF REGION | | 3 | | 3 | | 1 | |
| AVERAGE / WEIGHTED AVERAGE | 32.0% | 2 | 0.64 | 2.4 | 0.77 | 2.4 | 0.77 |
| TOTALS | 100.0% | | 2.25 | | 2.29 | | 1.88 |

*Fig. 6C*

SCORING MATRIX - COMBINED

BASE MODEL: "NEW ACQUISITION"
REAL ESTATE SOLUTION - LEASE VS. BUY ANALYSIS
SCORING MATRIX - COMBINED (FINANCIAL AND NON-FINANCIAL TOTALS)

| | OWNERSHIP - DEBT | | SYNTHETIC LEASE | | LEASE | |
|---|---|---|---|---|---|---|
| | RANK | WTD SCORE | RANK | WTD SCORE | RANK | WTD SCORE |
| FINANCIAL SCORING TOTALS | 3 | 2.79 | 2 | 2.09 | 1 | 1.03 |
| NON-FINANCIAL SCORING TOTALS | 2 | 2.25 | 3 | 2.29 | 1 | 1.88 |

FINANCIAL SCORING RANK (3+HIGHEST, 1+LOWEST)    NON-FINANCIAL SCORING RANK (3+HIGHEST, 1+LOWEST)

3 OWNERSHIP - DEBT                              3 SYNTHETIC LEASE
2 SYNTHETIC LEASE                               2 OWNERSHIP - DEBT
1 LEASE                                         1 LEASE

Fig. 6D

SYSTEM AND METHOD FOR EVALUATING REAL ESTATE FINANCING STRUCTURES

FIELD OF THE INVENTION

The present invention relates to a system and a method for evaluating real estate financing structures. Specifically, the present invention provides a system and a method for determining an optimal financing structure for controlling a real estate asset via a model. More specifically, a user may enter into the model information related to the procurement of a real estate asset and of the entity desiring to procure the real estate asset. The system and method analyzes the inputted information and rates various financing structures that may be used for the control of the real estate asset, including, for example, whether the entity, should own the real estate asset, lease the real estate asset or control the real estate asset via another financing structure.

BACKGROUND OF THE INVENTION

It is, of course, known that real estate assets may be owned or otherwise controlled in a variety of ways. Generally, a piece of real estate, or other type of real estate asset, may be leased or owned by an entity, such as a corporate or governmental entity. The particular financing structure used by the entity depends on a plurality of factors, including, for example, the entity's particular financial situation and how the real estate asset is to be utilized by the individual or entity. For example, an individual may decide that a real estate asset should be leased rather than owned after examining the costs and the benefits of leasing the property as compared to owning it.

The decision of how to control a real estate asset may get much more difficult and complicated when many of the various financing structures are analyzed and compared for a particular real estate asset at the same time. For example, there are a variety of ways that a real estate asset may be owned by an individual or an entity. An entity may, for example, own a real estate asset using corporate funds, may own with debt, may own via a real estate investment trust (REIT), or may own the property with a partnership or a joint venture with another individual or entity. Likewise, there are a variety of ways that an individual or an entity may lease a real estate asset. For example, an individual or entity may utilize a short-term lease, a long-term lease, a credit sale and leaseback, a tax motivated leveraged lease or a synthetic lease. Each financing structure may have a plurality of costs and benefits that may be difficult to analyze. Further, a determination of which financing structure is best for an entity may not be readily apparent unless and until the financing structures are compared against each other.

Of course, real estate assets are major balance sheet assets for entities, in the sense that large amounts of capital are typically devoted to the ownership or control of the real estate asset. Each particular financing structure that may be used to control a real estate asset has a variety of costs and benefits associated therewith, making financing structures particularly difficult to analyze and evaluate and the optimal control structure difficult to determine.

However, despite how relatively important real estate assets are to an entity, the decision as to the financing structure that is best suited for the particular entity has traditionally been an independent event, driven more by market factors than by a true and detailed analysis of how the real estate asset may benefit or otherwise impact the entity. And even market factors are typically analyzed improperly or unrealistically.

The decision of how to structure a procurement of a real estate asset has been approached inconsistently by entities. In fact, many companies do not have a systematic, consistent and disciplined approach to making financing decisions related to the control of real estate assets. For example, within a particular company, discounting methods vary within the company and costs of debt assumptions are inconsistent. In addition, there typically is no standard timeframe for evaluating a project; various individuals may use 5-, 10- or 15-year timeframes. Still further, foreign exchange rate assumptions typically vary as well.

Companies further make unrealistic residual or market value assumptions. For example, assumptions for determining future residual values can be unrealistic or unsupported. In addition, sensitivity analysis of key financial drivers typically is not considered. Further, current market valuations for sale/leaseback analyses can often be overly optimistic and can sometimes hide funding in the evaluation of the purchase price.

In addition, many important criteria are often ignored when procuring real estate assets, such as, for example, occupancy requirements, flexibility, and broader corporate metrics. For example, EPS, ROA, and other key corporate ratios are often ignored. In addition, there may typically be a short-term focus on profitability at the expense of long-term strategic planning. Still further, there may be little understanding of, or sensitivity to, potential balance sheet implications of procuring a real estate asset.

Further, many non-financial elements are typically not considered or are severely under-weighted by individuals or entities. For example, corporate entities may enter into long-term leases without having exit strategies, which affects the value of the real estate asset to the corporate entity. Although a long-term lease can lower short-term impact on the operating budget, there may be long-term negative effects that are not considered. Further, there may be no common definition within a corporate entity of "core" versus "non-core" assets.

Still further, many entities are composed of a plurality of individuals or sub-entities that may have conflicting agendas about the particular real estate asset. For example, an entity, such as a corporation, may have a plurality of management teams that may have to submit approval to an individual or group chosen or assigned to procure the real estate asset. There may be a real estate management team, a treasury team and/or a senior management team, for example, that all may have conflicting needs or desires. Moreover, there may be external groups outside that may have to be reconciled such as, for example, shareholders, stock analysts and credit rating agencies.

In addition, many companies may be in a reactive mode, especially when the economy is in a down-cycle, and consequently do not have the time nor the internal resources or procedures to analyze and evaluate the various financing structures for procuring a real estate asset.

Further, there is generally a lack of understanding among entities as to what the various financing structures for controlling a real estate asset are and how the various structures for the procurement of a real estate asset can be used to influence various performance metrics that may be tracked in a corporation or other type of entity. In addition, new financing methodologies appear frequently, but are typically not well understood by pertinent decision-makers. For example, tax incentives that may be associated with the sale or leaseback of a real estate asset are often ignored. Moreover, individuals typically focus on local tax issues without considering, or understanding, how global tax issues may be influenced. Moreover, there may be inadequate training of key personnel that may contribute to a lack of understanding of the various financing structures.

In addition, many real estate assets are typically procured without any real global ownership of the analytical process. Decisions are often driven by local considerations and evaluation criteria, instead of recognizing the global and expansive nature of a large corporation. Typically, analysis is done by an individual or a small group of individuals instead of by various individuals in a corporation that may represent many differing points of view. Therefore, many individuals within a corporation do not feel as if they are part of the decision-making process.

Given the relative importance of real estate assets to an entity's bottom line, a system and a method are needed that will overcome the deficiencies as noted above. More specifically, a system and a method are needed that will provide a strategic and consistent approach to real estate asset procurement. Moreover, a system and a method are needed that will integrate real estate financing decision-making with non-financial criteria.

SUMMARY OF THE INVENTION

The present invention relates to a system and a method for evaluating real estate financing structures. Specifically, the present invention provides a system and a method for determining an optimal financing structure for controlling one or a plurality of real estate assets. More specifically, the present invention provides a system and a method whereby a user enters into the system detailed information related to the real estate asset and an entity desiring to procure the real estate asset. The system analyzes the inputted information and rates the various financing structures. For example, the system analyzes whether an entity should own the asset, lease the asset, or otherwise control the asset via another financing structure.

The present invention further provides a system and a method for providing a detailed cash flow and matrix decision framework to determine an optimal financing structure for controlling a real estate asset. Numerous decision criteria are incorporated into the system and the method, and may be grouped into two broad categories: financial, or quantitative, factors and non-financial, or qualitative, factors. Each criterion contained within the two broad categories may be defined and given a weighting to establish its importance relative to other criteria. A plurality of financing structures may then be tested and scored for each criterion and total scores for each financing structure may be compared to determine an optimal financing solution for the real estate asset.

It is, therefore, an advantage of the present invention to provide a system and a method for evaluating various financing structures for the control of a real estate asset. The present invention builds consensus among various participants that may have individual agendas because each participant has a stake in the final result. Further, the present invention consolidates into one place the various issues and concerns of the various stakeholders in the financing decisions. The present invention incorporates many factors in the decision-making process that are typically important to most participants of the financing decision.

Moreover, it is an advantage of the present invention to provide a system and a method for evaluating various financing structures for the control of a real estate asset that further provides a structured and consistent methodology for determining the allocation of scarce capital resources across different geographical regions and product types. The present invention addresses many relevant issues within the context of identified objectives and performance metrics.

In addition, it is an advantage of the present invention to provide a system and a method for evaluating various financing structures for the control of a real estate asset that further is pro-active in using the various ways of holding, controlling or owning the real estate assets to influence desired financial results. Further, it is an advantage to provide a system and a method that transforms a real estate asset from a static "fixed asset" to a significant contributor of effective balance sheet management.

Additional features and advantages of the present invention are described in, and will be apparent from, the detailed description of the presently preferred embodiments and from the drawings.

BRIEF DESCRIPTION OF THE DRAWINGS

FIGS. 6A-6D illustrate a scoring matrix of quantitative and qualitative factors, and a combined scoring matrix.

DETAILED DESCRIPTION OF THE PREFERRED EMBODIMENTS

The present invention relates to a system and a method for evaluating various financing structures that may be used to control a real estate asset by an individual or an entity, such as, for example, a government entity, a corporate entity, or any other entity that may be apparent to one having ordinary skill in the art. More specifically, a computer may be used for the inputting of information related to the real estate asset that may be evaluated via a computer processor to determine an optimal financing structure for the real estate asset. The results of the analysis may be presented in a simple form that may inform a user of which particular financing structure is optimal for a particular real estate asset.

Figure 1:
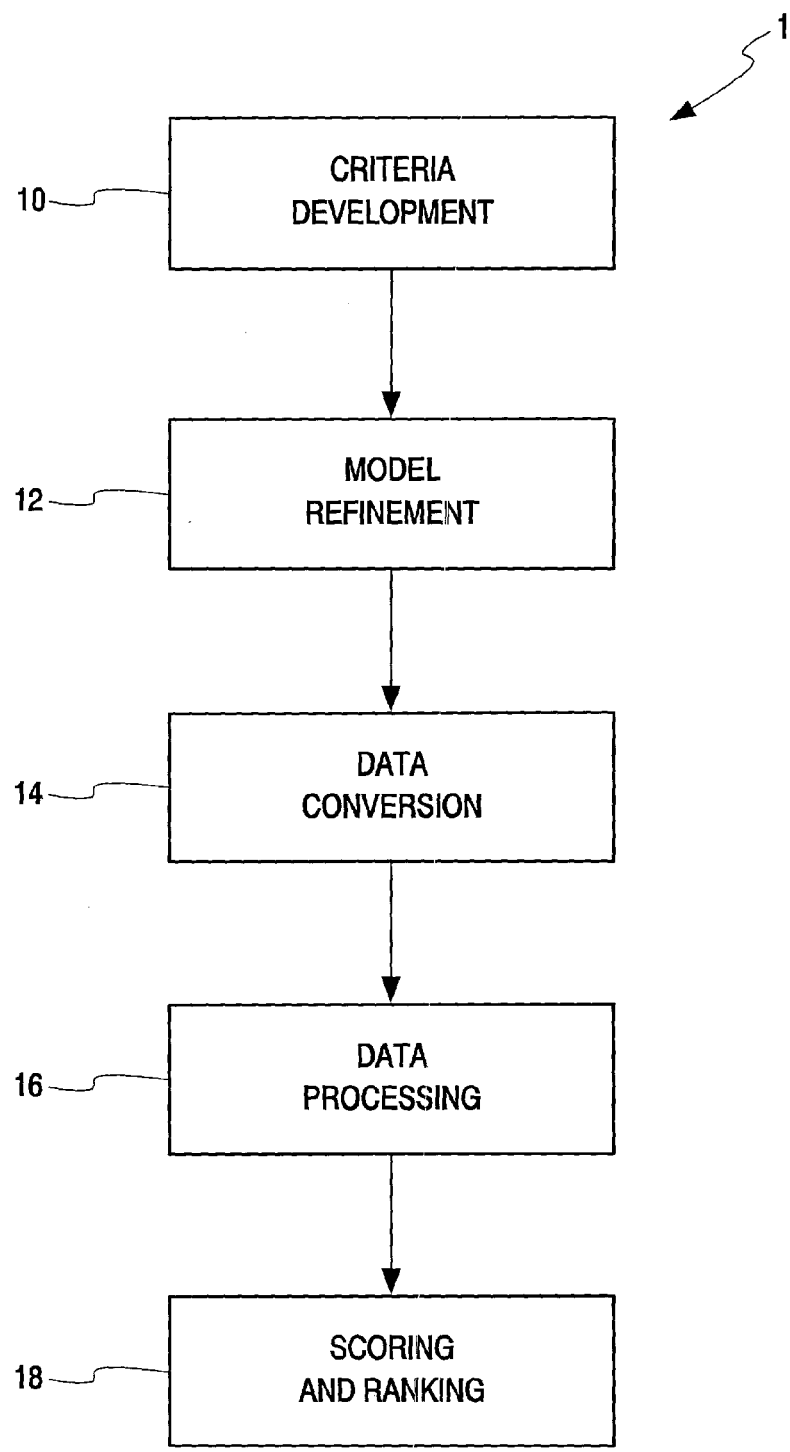
FIG. 1 illustrates a general process for the evaluation of financing structures for the control of a real estate asset in an embodiment of the present invention.

Now referring to the figures, wherein like numerals refer to like features, FIG. 1 shows an overall process 1 that is used to determine an optimal financing structure from a plurality of financing structures. A criteria development step 10 is used to evaluate the client and determine the scope of the project. The criteria development step 10 is further used to determine the possible financing structures that are contemplated for control of the real estate asset and to define key criteria that are utilized to determine the optimal financing structure. In addition, a model is developed that is utilized to evaluate and compare the differing financing structures.

After the criteria development step 10, the model that had been developed is refined via the model refinement step 12. The model refinement step 12 includes the development of decision matrices and the abstraction of specific property data that may be utilized in the model that is developed. The specific property data that may be abstracted in the model refinement step 12 may be utilized in a data conversion step 14 that may be utilized to convert the specific property data into either cash values (such as, for example, dollars) and area values (such as, for example, square feet) or any other value apparent to one having ordinary skill in the art. A data processing step 16 may then be done to determine cash flow analyses from the information supplied in the data conversion step 14. The data processing step 16 may prepare financial assumptions that may be utilized by the model. Moreover, non-financial indicators may be determined and processed in the data processing step 16 to quantify non-financial, or qualitative, data.

The financial, or quantitative, data and the non-financial, or qualitative, data is weighted and scored and the various financing structures are ranked according to their scores. These may be done via a scoring and ranking step 18, that may be utilized to present the results of the analysis to the entity desiring to control the real estate asset via one of the financing structures.

Information relating to the model that is developed, and the financial and non-financial factors that are evaluated are input into a computer processor that may store and process the data input therein. The computer processor typically includes an input device, such as, for example, a keyboard or mouse, a processing means, a database for storing the information, and an output means, such as a printer or a monitor. The processor may manipulate the data in any way as is apparent to one having ordinary skill in the art. The information is preferably entered into an Microsoft Excel spreadsheet and database application for processing and/or manipulating of the information.

Of course, the above-identified general process may be used for any entity and for any real estate asset that is desired by the entity. The following describes a specific example of how each step 10-18 may be utilized to determine an optimal financing structure.

Figure 2:
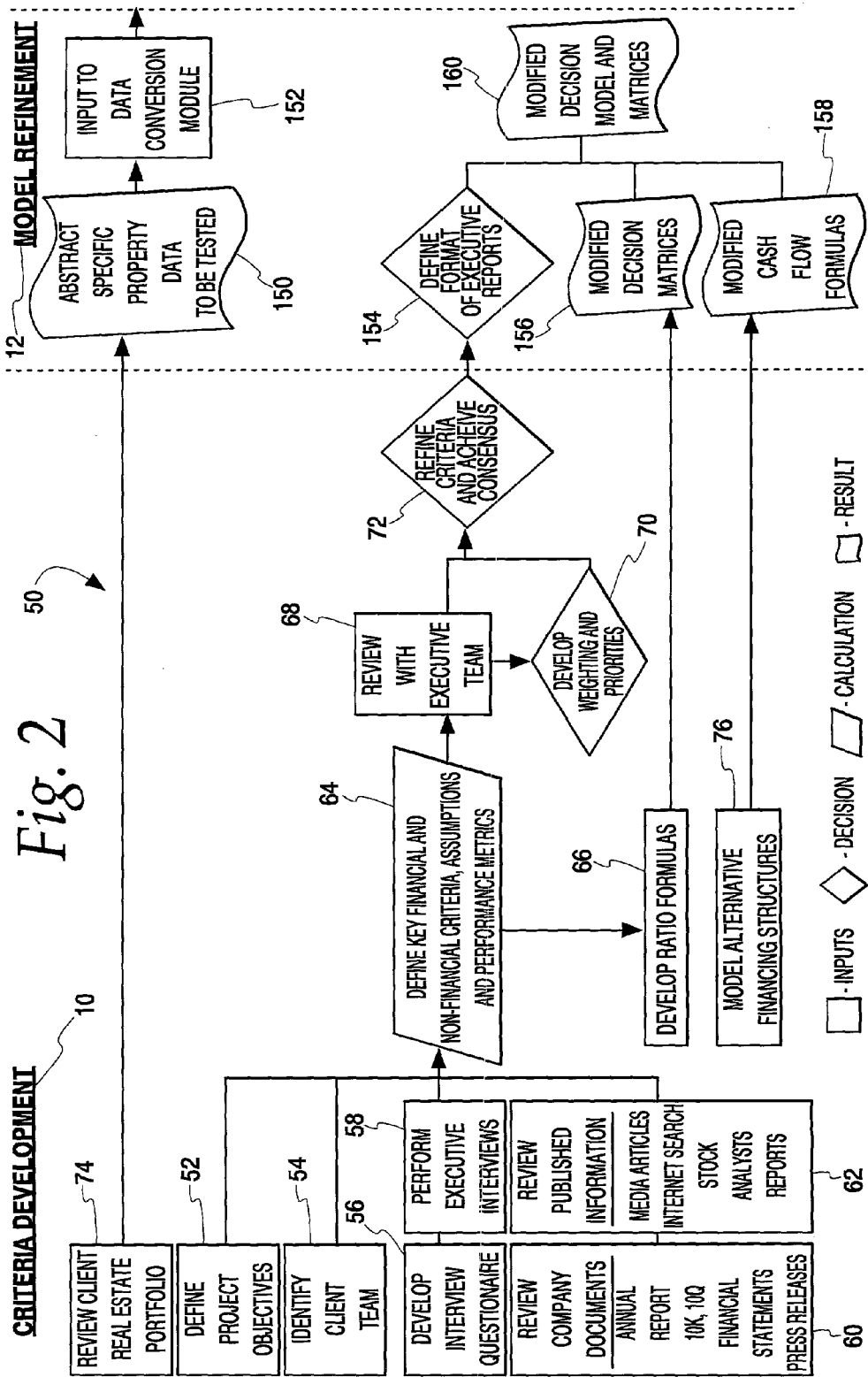
FIG. 2 illustrates a process that highlights criteria development and model refinement for the evaluation of financing structures in an embodiment of the present invention.

FIG. 2 illustrates a specific process 50 that is followed to accomplish the present invention. Of course, this specific process 50 may be particular to a specific entity and variations of this process may be useful for other entities, as apparent to one skilled in the art. The criteria development step 10, as shown in FIG. 1, is specifically defined in FIG. 2. A necessary first step in the criteria development step 10 is to define the project objective, as shown in step 52. Further, a client team is identified via step 54. An interview questionnaire is developed, as shown in step 56, and executive interviews are conducted via step 58. Next, the company documents is reviewed via step 60. Specific company documents that are reviewed include annual reports, 10K and 10Q financial statements and press releases. Of course, other documents may be reviewed and analyzed for particular information, such as, for example, published information via step 62. These preliminary steps 52-62 are done to define key financial and non-financial criteria, assumptions, and performance metrics via step 64 that are important in the evaluation of the financing structures that are used to control the real estate asset.

Once the information is identified and defined via step 64, then the team develops ratio formulas via step 66. Further, the information identified and defined in step 64 are reviewed with an executive team via step 68 and weightings and priorities for the various financial and non-financial criteria, assumptions, and performance metrics are developed via step 70. The criteria are refined and consensus should be achieved among the team via step 72.

In addition, the client real estate portfolio should be reviewed via step 74 to start to identify key information about the real estate asset that the client desires to control via a financing structure. Moreover, the various financing structures should be identified and modeled via step 76.

Figure 5:
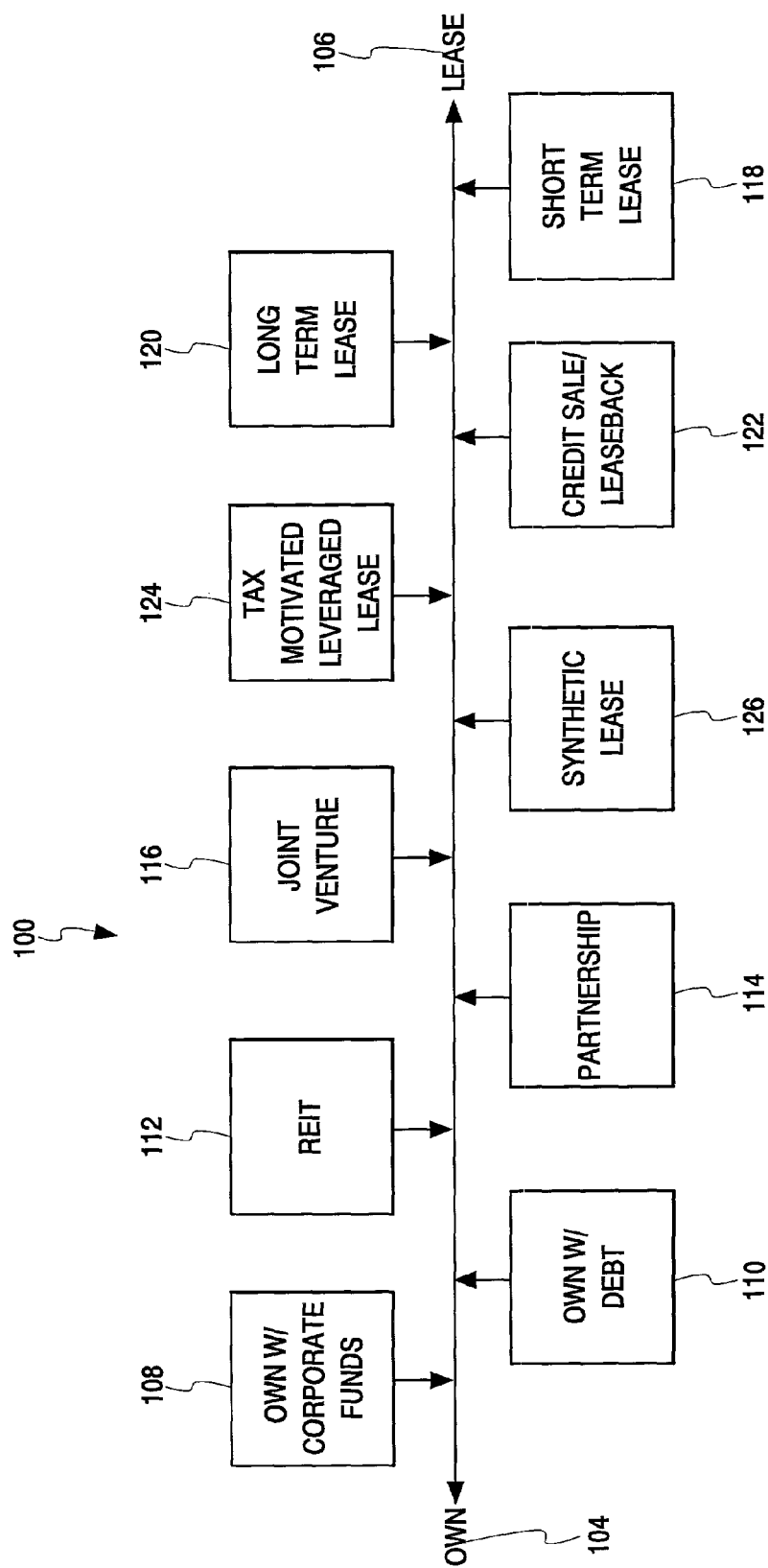
FIG. 5 illustrates an "own" versus "lease" spectrum showing a plurality of financing structures that may be used to control a real estate asset.

FIG. 5 illustrates a spectrum 100 of types of financing structures that may be utilized to procure a real estate asset. The spectrum 100 is arranged to show ownership 104 on a first side (representing total (or near total) control of the real estate asset), and a lease 106 on a second side (representing minimal control over a real estate asset in the form of a rental arrangement of the real estate asset). Representative financing structures are displayed between ownership 104 and lease 106. Examples of "ownership" are: an entity may own with corporate funds 108, may own with debt 110, may own using a real estate investment trust (REIT) 112, and may own via a partnership 114 or a joint venture 116. Each of these ownership structures may have varying costs and benefits associated therewith, with varying degrees of ownership and/or control involved. In addition, an entity may lease a real estate asset via a short term lease 118, a long term lease 120, a credit sale/leaseback 122, a tax motivated lease 124, or a synthetic lease 126. As with ownership, each of these leasehold structures may involve varying costs and benefits and varying degrees of control. It should be noted that this list of financing structures is not meant to be exhaustive.

Further, each financing structure may affect corporate metrics in a variety of different ways. This invention contemplates the use of any type of financing structure that may be apparent to one having ordinary skill in the art. The particular financing structure that may be ideal for an entity may depend on a number of factors, including, for example, the entity's financial situation, the use for the real estate asset, and/or the state or condition of the real estate asset. Of course, a number of other factors may be included as may be apparent to one having ordinary skill in the art.

Still referring to FIG. 2, the model refinement step 12 is detailed. Specifically, the model refinement step 12 includes a step 150 that may be utilized to abstract specific property data to be tested after the client real estate portfolio has been reviewed via step 74. Once the specific property data has been abstracted, then the property data is input to the data conversion module via step 152, as shown in FIG. 3.

Moreover, after the criteria has been refined and the team has reached consensus about the weightings and priorities of the key financial and non-financial criteria, assumptions, and performance metrics via step 72, then the team defines a format for the executive reports or the reports that will be generated after the various financing structures have been evaluated via step 154. Moreover, various decision matrices are modified via step 156 after the ratio formulas have been developed via step 66. Moreover, cash flow formats are modified via step 158 after the various financing structures have been modeled via step 76. Steps 154, 156 and 158 are utilized to modify decision model and matrices via step 160. Once the decision model and matrices have been modified after careful review from the team, then the model should be in a state whereby the financial, or quantitative, and non-financial, or qualitative, information may be entered thereinto to determine an optimal financing structure.

Figure 3:
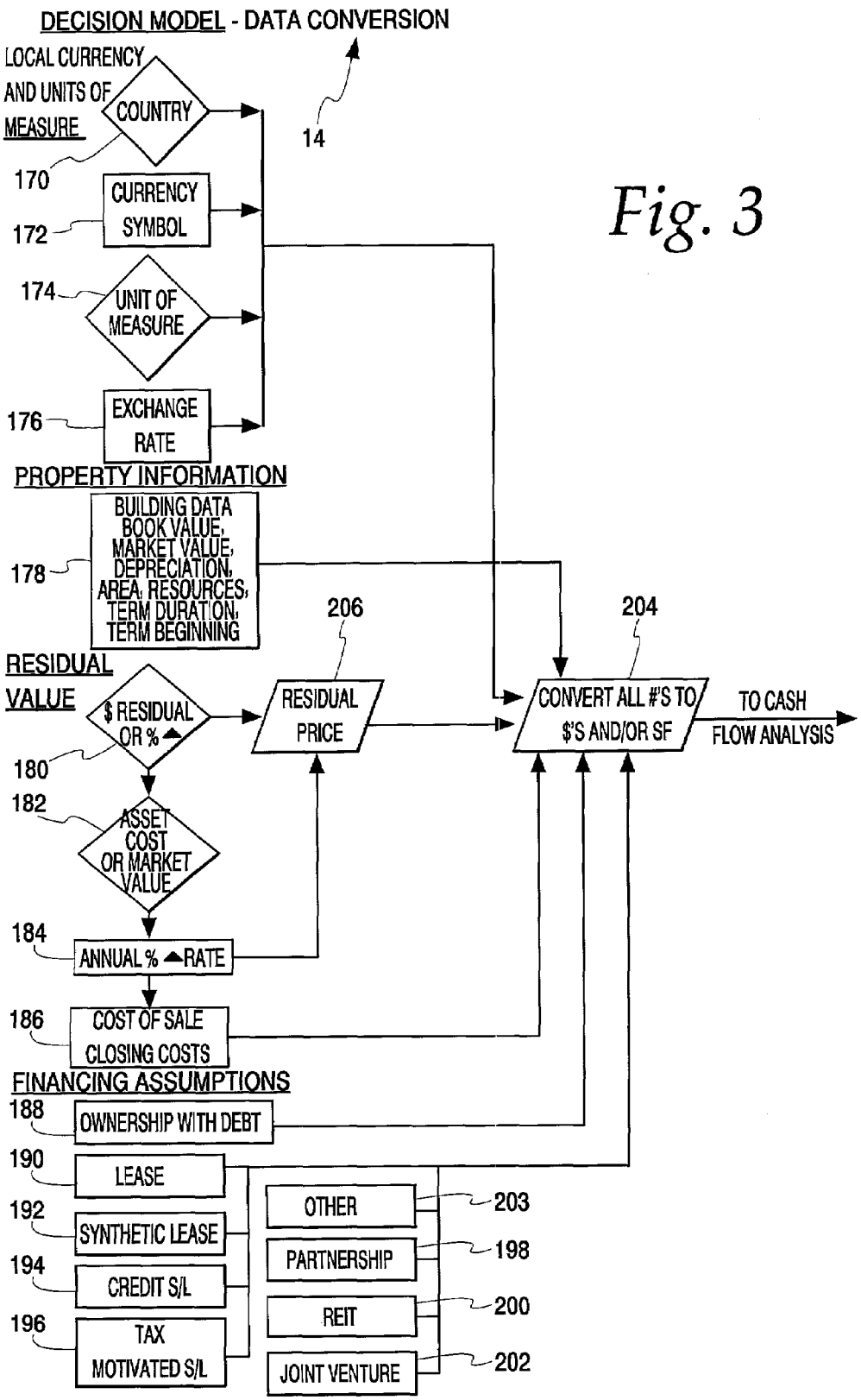
FIG. 3 illustrates a continuing process that highlights data conversion for the evaluation of financing structures in an embodiment of the present invention.

FIG. 3 illustrates a detailed process for the data conversion step 14, as shown in FIG. 1. Specifically, a variety of information is entered into the model to be converted into cash and/or square feet, depending on the type of measurement. The information that is entered and converted via the data conversion step 14 may be:

1. Information to set the currency and unit of measurement, including the country, currency, currency symbol, exchange rate (local currency to U.S.). This may be done via steps 170-176, as illustrated in FIG. 3.

2. Information on the real estate asset situation, including the year acquired/built, the original cost including the land cost, the building cost and any additional TI since the acquisition, the market value of the real estate asset at year 0, the accumulated depreciation of the real estate asset and the number of years of depreciation, the building area, the land area, the land/building ratio, the capital reserve/building maintenance (typically measured in currency unit/area/annum), the beginning fiscal year, and the lease term or holding period of the real estate asset. This information may be entered into the model via step 178, as shown in FIG. 3.

3. Information on the residual value of the real estate asset at market, including how to report the value (such as, for example, as a percent change of the market value), an historical market trend annual percent change, an inflation rate projection, an additional tested rate, and a cost of sale including commission and closing costs (further including survey fees, title fees, transfer fees, environmental study fees, and other). This information may be entered into the model via steps 180-186, as shown in FIG. 3. Moreover, the information relating to the residual value or the percent change and the annual percent change rate may be utilized to determine a residual price via step 206.

4. Information on debt assumption, including a loan amount or principal balance, a loan to value percentage, an origination fee, and years of amortization. This information may be entered via step 188.

5. Information of lease assumptions, including a contractual year one rental rate (typically in price of square foot/annum). This information may be entered via step 190.

6. Information on synthetic lease assumptions, including the synthetic lease fee (gross up factor), including the arranger fee, accounting fees, legal fees, transfer fees, investor fees and other fees, and a first year rental constant, including the index (treasury corresponding to the length of the contract), the margin of spread, and the origination fee. This information may be entered via step 192.

7. Information on other financing structures, including credit sale/leaseback information via step 194, tax-motivated leveraged lease via step 196, a partnership via step 198, a real estate investment trust via step 200, and a joint venture via step 202. Of course, information on other financing structures may be entered into the model via step 203 as may be apparent to those skilled in the art.

Of course, any other information may be entered into the model as may be apparent to those skilled in the art, pursuant to the real estate asset and the entity that is desiring to procure the real estate asset. All of the previous information is entered into the model so that the information may be converted to either a cash amount (such as, for example, American dollars) or to an area amount (such as, for example, square feet). Once the information is converted into cash amounts or area amounts via step 204, the converted information is processed via the data processing step 16, which is illustrated in detail as shown in FIG. 4.

Figure 4:
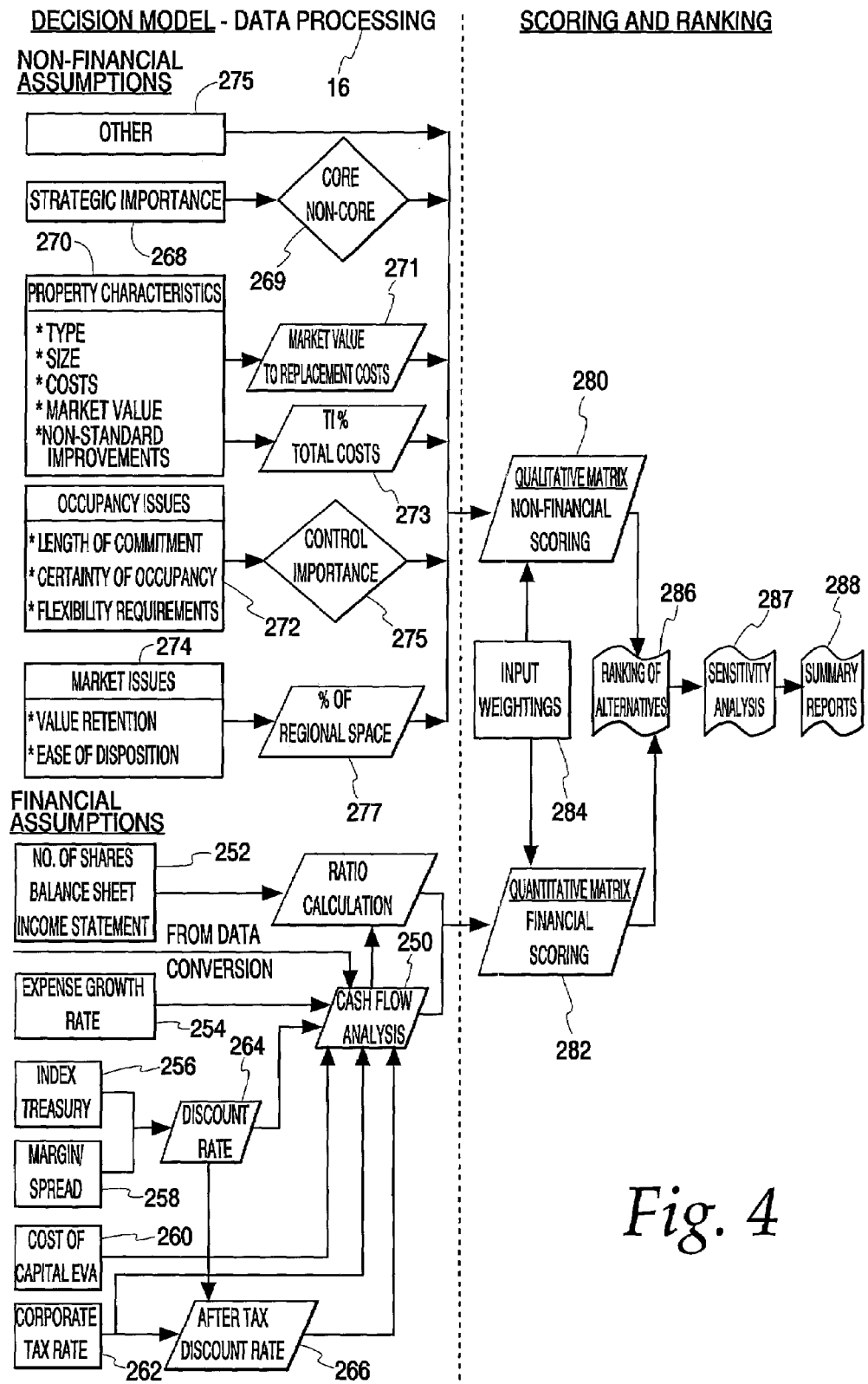
FIG. 4 illustrates a continuing process that highlights data processing, scoring and ranking of financing structures for the procurement of a real estate asset in an embodiment of the present invention.

The information from the data conversion step 14, as shown in FIG. 3, is entered into the model via the data processing step 16 to determine the cash flow analyses via step 250, pursuant to the data processing step 16, shown in detail in FIG. 4. In addition, other information is used to accomplish the cash flow analyses via step 250. For example, the following information may be utilized:

Information on the company or entity, including the number of common shares outstanding by average and by average on a diluted basis, balance sheet information such as total assets, average total assets, current liabilities, other liabilities (including long-term debt), stockholder's equity, working capital and long-term debt, an income statement including net sales and interest expense, an expense growth rate, an index treasury, a margin or spread, a cost of capital (EVA capital charge) and a tax rate. This information is entered and processed in the model via steps 252-262. Moreover, the index treasury and the margin or spread are utilized to determine the discount rate via step 264, and the discount rate and the corporate tax rate are utilized to determine the after tax discount rate via step 266. The information presented herein relating to financial, or quantitative, factors is processed into cash flow data sheets. The information is further processed into a plurality of performance metrics, as shown below:

Financial Strength Metrics

Free Cash Flow: operating cash flows minus (plus) the increase (decrease) in working capital (excluding change in cash, marketable securities, and short-term debt).

Debt to Capital: (long-term debt plus current maturities, commercial paper, and other short-term borrowings) divided by (long-term debt plus current maturities, commercial paper, and other short term borrowings plus stockholders' equity plus minority interest).

EBIT Interest Coverage Ratio: earnings from continuing operations before interest and taxes divided by gross interest before subtracting capitalized interest and interest income.

Profitability Ratios

Basic Earnings (from continuing operations) per share: earnings from continuing operations divided by (weighted average number of common shares outstanding plus dilutive potential common shares)

Earnings (from continuing operations) per share on a diluted basis: earnings from continuing operations divided by (weighted average number of common shares outstanding plus dilutive potential common shares).

S.G.A. (selling, general and administrative) as a percentage of net sales: selling, general and administrative expenses divided by net sales.

Management Effectiveness

Return on Equity: earnings on continuing operations divided by average stockholders' equity.

Return on Total Capital: earnings from continuing operations divided by (average long-term debt plus current maturities, commercial paper, and other short-term borrowings plus stockholders' equity plus minority interest).

Return on Assets: earnings from continuing operations divided by average total assets.

Working Capital as a percentage of sales: (current assets minus current liabilities) divided by net sales.

Efficiency

Net Earnings Per Employee: net earnings divided by total employees.

Other

EVA: net operating profit after tax (NOPAT) minus (cost of capital times average adjusted net assets).

Of course, other performance metrics may be generated from the information that is entered into the model as may be apparent to those skilled in the art. The above shows a representative example of particular performance metrics that may be useful, and the invention is not meant to be limited in this regard.

The performance metrics as noted above are presented in one or a plurality of cash flow sheets that are created after the cash flow analyses via step 250. The cash flow sheets may be utilized by the user of the system to aid in the determination of which financing structure the user should utilize to control the real estate asset. The cash flow statements present a plurality of performance metrics calculated as noted above. Moreover, the cash flow sheets may be generated showing a comparison of key performance metrics for the financing structures. For example, the cash flow sheets may show an income statement for the present fiscal year (or the first year of the real estate asset control), showing expenses, operating profit, other expenses or income, earnings or losses before income taxes, and earnings or losses from continuing operations. Moreover, the cash flow sheets may show a balance sheet showing assets of cash and/or property, and liability and stockholders' equity. In addition, cash flows may be shown on the cash flow sheets, as well as a balance sheet impact, a P&L cost impact, a credit risk, and profitability ratios. Of course, the cash flow sheets may show other information as may be apparent to one having ordinary skill in the art.

The financial information that is entered into the model and processed into the cash flow analyses and ratio calculations may be applied to each financing structure that is being evaluated to determine a relative ranking of the financing structure via a scoring matrix that is used to determine the financial or quantitative score via step 282. The relative ranking then acts as an indicator value for that particular financial factor. For example, for the net present value after tax factor that may be determined from the cash flow analyses pursuant to step 250, the financing structure "own with debt" may be ranked higher than "synthetic lease" and "lease". Moreover, "synthetic lease" may further be ranked higher than "lease". Therefore, assuming that only the "own with debt", "synthetic lease" and "lease" financing structures are being evaluated, the "own with debt" financing structure would obtain a relative ranking (and hence an indicator value) of "3", the "synthetic lease" financing structure would obtain a relative ranking of "2", and the "lease" financing structure would obtain a relative ranking of "1".

The relative rankings and, consequently, the indicator values of the financial factors are weighted according to the importance of the particular financial structure. For example, the following weightings may be assigned for a particular client and a particular real estate asset. Input weightings are used via step 284 so that each factor defined above may be scored and properly used to determine a total score for each financing structure. For example, the net present value after tax is given a 50% weighting; the EVA is given a 10% weighting; the balance sheet impact (including the total debt to capital and the capital requirement) is averaged and given a 5% weighting; the P&L cost impact (including the 1st year impact on earnings from continuing operations and the 12th year cumulative impact on earnings from continuing operations) is averaged and given a 15% weighting; the credit risk (including the EBIT interest coverage, the EBITDA interest coverage, the free cash flows to total debt and the finds from operations to total debt) is averaged and given a 15% weighting; and the profitability ratios (including the diluted EPS from continuing operations, the operating profit/net sales, the return on assets, the return on equity, and the return on total capital) is averaged and given a 5% weighting. Of course, these weightings may be specific to a particular entity based on the real estate asset and the situation of the entity. Other weightings may be useful for other entities and this invention is not meant to be limited in this regard. The weighting is applied to the indicator values and summed to give the total quantitative score for each financing structure.

Moreover, information related to non-financial or qualitative factors is entered into the model in the data processing step 16. The information related to non-financial or qualitative factors may include the following:

1. The real estate asset's strategic importance are entered via step 268 (core or non-core may be entered via step 269).

2. Property characteristics are entered via step 270 including, for example, the type of property (production facility, warehouse-distributor, office facility, technology facility or other) and the facility size, insured replacement cost, facility costs (tenant specific improvement and total improvements). The property characteristics may be utilized to determine the market value to replacement costs via step 271 and the TI % total costs via step 273.

3. Moreover, occupancy issues are entered via step 272 such as the length of the commitment (in increments of <5 years, 5-9 years, or 10> years), the certainty of the occupation (in values of "low" certainty, "medium" certainty, or "high" certainty) and the flexibility such as, for example, the control of the environment (in increments of "not critical", "<important", or "important") so that a control importance determination may be made via step 275.

4. Market issues are entered via step 274 such as liquidity, including value retention (i.e. market conformance, or whether the property is of general market use and acceptance in increments of "high", "medium" or "low") and ease of disposition (including factors such as the size of the market in increments of "primary" (for metropolitan population areas of population >1 million), "secondary" (150,000 to 1 million) or tertiary (<150,000); the quality of the market in increments of "oversupply", "equilibrium", or "undersupply"; and rent value trends in increments of "down", "flat" or "up"). Moreover, a percent of regional space factor may be determined via step 277.

5. Other information related to the non-financial, or qualitative, factors may be entered into the model pursuant to step 275 as may be apparent to those having ordinary skill in the art. This invention is not meant to be limited to the information described above with respect to information related to non-financial factors.

Further, the non-financial or qualitative factors are given indicator values based on how the particular non-financial or qualitative factor applies to a particular financing structure. For example, the following tables show how an analysis of non-financial or qualitative factors would be accomplished for three financing structures: ownership with debt, a synthetic lease, and a lease. Table 1 shows how each qualitative factor is quantified and given an indicator, based on how important the particular qualitative factor is to the financing structure "Own with Debt" with respect to the real estate asset.

TABLE 1

Indicator Values for Qualitative Factors of "Own with Debt" Financing Structure

| Qualitive Factor | Determinant | Indicator for "Own with Debt" | | |
|---|---|---|---|---|
| Strategic Importance | Degree Critical to Business | Non-Core<br>1 | | Core<br>3 |
| Property Characteristic | | | | |
| Facility Size | Square Feet | Small<br>1 | Med<br>2 | Large<br>3 |
| Replacement Cost | Total Replacement Cost | Low<br>1 | Med<br>2 | High<br>3 |
| Degree User Specific | TI's % of Bldg Cost | <20%<br>1 | 20-50%<br>2 | >50%<br>3 |
| Market Value/Book Value | Market Value/Replace Cost | Small<br>1 | Med<br>2 | Large<br>3 |
| Occupancy Issues | | | | |
| Length of Commitment | Term in Year | <5<br>1 | 5-9<br>2 | 10><br>3 |
| Certainty of Occupancy | Level of Certainty | Low<br>1 | Med<br>2 | High<br>3 |
| Flexibility (Control) | Level of Importance | Not Imp.<br>1 | <Imp.<br>2 | Imp.<br>3 |
| Market Issues (Liquidity) | | | | |
| Value Retention | Market Conformance | High<br>1 | Med<br>2 | Low<br>3 |
| Ease of Disposition | Size of Market | Prim.<br>1 | Second.<br>2 | Tert.<br>3 |
| | Quality of Market | Oversup.<br>1 | Equil<br>2 | Under<br>3 |
| | Rent Value Trends | Down<br>1 | Flat<br>2 | Up<br>3 |
| | User % of Region | >80%<br>1 | 50-80%<br>2 | <50%<br>3 |

Each qualitative factor is scored as defined in Table 1 shown above with respect to the "Own with Debt" financing structure. Table 2 shows a similar chart, but with the financing structure of "Synthetic Lease" instead of "Own with Debt", as shown in Table 1.

TABLE 2

Indicator Values for Qualitative Factors of "Sythetic Lease" Financing Structure

| Qualitive Factor | Determinant | Indicator for "Syntyhetic Lease" | | |
|---|---|---|---|---|
| Strategic Importance | Degree Critical to Business | Non-Core<br>1 | | Core<br>3 |
| Property Characteristic | | | | |
| Facility Size | Square Feet | Small<br>1 | Med<br>2 | Large<br>3 |
| Replacement Cost | Total Replacement Cost | Low<br>3 | Med<br>2 | High<br>1 |
| Degree User Specific | TI's % of Bldg Cost | <20%<br>3 | 20-50%<br>2 | >50%<br>1 |
| Market Value/Book Value | Market Value/Replace Cost | Small<br>3 | Med<br>2 | Large<br>1 |
| Occupancy Issues | | | | |
| Length of Commitment | Term in Year | <5<br>3 | 5-9<br>2 | 10><br>1 |
| Certainty of Occupancy | Level of Certainty | Low<br>3 | Med<br>2 | High<br>1 |
| Flexibility (Control) | Level of Importance | Not Imp.<br>1 | <Imp.<br>2 | Imp.<br>3 |
| Market Issues (Liquidity) | | | | |
| Value Retention | Market Conformance | High<br>3 | Med<br>2 | Low<br>1 |

TABLE 2-continued

Indicator Values for Qualitative Factors of "Sythetic Lease" Financing Structure

| Qualitive Factor | Determinant | Indicator for "Syntyhetic Lease" | | |
|---|---|---|---|---|
| Ease of Disposition | Size of Market | Prim. 3 | Second. 2 | Tert. 1 |
| | Quality of Market | Oversup. 1 | Equil 2 | Under 3 |
| | Rent Value Trends | Down 1 | Flat 2 | Up 3 |
| | User % of Region | >80% 1 | 50-80% 2 | <50% 3 |

Each qualitative factor is scored as defined in Table 2 shown above with respect to the "Synthetic Lease" financing structure. Note that some of the indicator values for "synthetic lease" are different compared to "own with debt". For example, a shorter length of commitment may be good for a synthetic lease. Therefore a term of "<5" years may be assigned the highest indicator value. However, long-term length of commitment may be good for an "own with debt" financing structure. Therefore, as shown in Table 1, a term of "<5" years may be assigned the lowers indicator value. Table 3 shows a similar chart, but with the financing structure of "Lease" instead of "Own with Debt" or "Synthetic Lease", as shown in Tables 1 and 2.

Each qualitative factor is scored as defined in Table 3 shown above with respect to the "Lease" financing structure. Moreover, similar tables may be developed and utilized for each financing structure shown in FIG. 5, and for any other financing structure as may be apparent to one having ordinary skill in the art, depending on the types of financing structures that are evaluated for a particular real estate asset.

After each qualitative factor has been assigned an indicator value, based on how the qualitative factor applies to each of the financing structures, then each qualitative indicator is weighted and summed for a total qualitative score for each financing structure. These factors are scored and

TABLE 3

Indicator Values for ualitative Factors of a "Lease" Financing Structure

| Qualitative Factor | Determinant | Indicator for "Syntyhetic Lease" | | |
|---|---|---|---|---|
| Strategic Importance | Degree Critical to Business | Non-Core 3 | | Core 1 |
| Property Characteristic | | | | |
| Facility Size | Square Feet | Small 3 | Med 2 | Large 1 |
| Replacement Cost | Total Replacement Cost | Low 3 | Med 2 | High 1 |
| Degree User Specific | TI's % of Bldg Cost | <20% 3 | 20-50% 2 | >50% 1 |
| Market Value/Book Value | Market Value/Replace Cost | Small 3 | Med 2 | Large 1 |
| Occupancy Issues | | | | |
| Length of Commitment | Term in Year | <5 3 | 5-9 2 | 10> 1 |
| Certainty of Occupancy | Level of Certainty | Low 3 | Med 2 | High 1 |
| Flexibility (Control) | Level of Importance | Not Imp. 3 | <Imp. 2 | Imp. 1 |
| Market Issues (Liquidity) | | | | |
| Value Retention | Market Conformance | High 3 | Med 2 | Low 1 |
| Ease of Disposition | Size of Market | Prim. 3 | Second. 2 | Tert. 1 |
| | Quality of Market | Oversup. 3 | Equil 2 | Under 1 |
| | Rent Value Trends | Down 3 | Flat 2 | Up 1 |
| | User % of Region | >80% 3 | 50-80% 2 | <50% 1 | weighted according to how important the factors are and the total scores may be calculated based on the weightings of the non-financial factors.

For example, the non-financial, or qualitative factors are weighted as follows: the strategic importance of the real estate asset is given a 15% weighting; the property characteristics (including the facility size, the replacement cost, the degree user specific, and the market value/book value) are averaged and given a 23% weighting; the occupancy issues (including the length of the commitment, the certainty of the occupation and the flexibility) are averaged and given a 30% weighting; and the market issues (including the liquidity, which includes the value retention or market conformance and the ease of disposition, which includes the size of the market, the quality of the market, the rent/value trends and the user % of the region) are averaged and given a 32% weighting. The weighting is applied to the indicators and summed to give the total qualitative score for each financing structure. Of course, the weighting may be changed as applicable if it is determined that a particular factor should be given more or less weight.

Once the quantitative and qualitative total scores are calculated for each financing structure, then each financing structure may be easily ranked via step 286 and compared against the other financing structure or structures so that the optimal financing structure may be determined. Typically, the quantitative and the qualitative total scores are summer, and an overall total score is generated. The ranking of each financing structure may then be done via step 286. Generally, the financing structure having the greatest total score represents the optimal financing structure that should be utilized for control of the real estate asset.

After the total scores are calculated for each financing structure, a sensitivity analysis may be conducted via step 287. The sensitivity analysis, also known as a residual value sensitivity analysis, quantifies and plots the net present value after tax of each financing structure as a function of the market value growth rate. The sensitivity analysis shows whether to compensate for uncertain conditions, i.e., the analyst can determine how sensitive the costs are to moderate changes in the forecast.

Once the total scores for each financing structure have been determined, taking into consideration both the financial (or quantitative) factors and the non-financial (or qualitative) factors, and the sensitivity analysis has been done via step 287, then the results of the evaluation are presented via the presentation of results in summary reports via step 288. The summary reports include an executive summary, showing a description of the real estate asset, a description of use of the real estate asset, and the location of the business units affected. The optimal financing structure is shown as well, and the relative rankings of the financing structures are categorized in the following ways: by cash flows, including the net present value after tax and the economic value added; and by book income or loss, including the first year impact on earning from continuing operations and the twelve year cumulative impact on earnings from continuing operations. Moreover, the executive summary may further show a residual value sensitivity analysis showing a net present value after tax as a function of the market value growth rate. However, any performance metrics may be used to categorize the financing structures as may be apparent to one having ordinary skill in the art. The presentation of results may further show other results that may be apparent to one having ordinary skill in the art.

EXAMPLE

FIGS. 6A-6D show a specific example of a real estate asset that may be evaluated for a particular entity. In the example, only three financing structures are evaluated: "Ownership-Debt"; "Synthetic Lease"; and "Lease". Further, the various steps were conducted, including the criteria development step 10, the model refinement step 12, the data conversion step 14 and the data processing step 16, as described above with reference to FIGS. 1-5.

FIG. 6A shows how the financial factors may be evaluated with respect to the real estate asset and the entity. As shown in FIG. 6A, each financial, or quantitative, factor is ranked. Certain financial factors have sub-factors or performance metrics that may be contained within particular financial factor groupings. For example, the "Balance Sheet Impact" has "total debt to capital" and "capital requirement" sub-factors. To determine a score for each financial factor having the sub-factors, the sub-factors are averaged together to get a total average score for that financial factor. So, for the "Balance Sheet Impact" under the "Ownership-Debt" financing structure, the "total debt capital" sub-factor has a score of "1", while the "capital requirement" sub-factor also has a score of "1", for an average of "1" for the "Balance Sheet Impact" total score.

Moreover, the total scores for each financial factor are weighted relative to the importance of the financial factor to the total financial, or quantitative, score. For example, the net present value after tax financial factor is relatively important to the financial, or quantitative, score, so that it receives a 50% weighting. After each financial factor is scored for each financing structure, as shown in FIG. 6A, and the scores are weighted pursuant to their relative importance, total scores for each financing structure are tallied and averaged. For the "Ownership-debt" financing structure, the weighted average score is 2.79; for "Synthetic Lease", the weighted average score is 2.09; and for "Lease" the weighted average score is 1.03.

FIG. 6B shows how the non-financial, or qualitative, factors are scored. For example, the "Strategic Importance" receives a score of "3" for being a core real estate asset for the "Ownership-Debt" and "Synthetic Lease" financing structures, but receives a score of "1" for the "Lease" financing structure, indicating that the fact that the real estate asset would be a "core" asset to the entity is not as important for the "Lease" financing structure as for the "Ownership-Debt" or "Synthetic Lease" financing structures.

The scores may be tallied and weighted, as shown in FIG. 6C. Similarly, the non-financial factors may have sub-factors that may be averaged to give a total non-financial factor score, which is then weighted pursuant to its importance. In the present example, the "Ownership-Debt" financing structure has a score of 2.25; the "Synthetic Lease" has a score of 2.29; and the "Lease" financing structure has a score of 1.88.

FIG. 6D shows a combined scoring matrix that summarizes how each financing structure scores for the real estate asset and the entity in the financial and non-financial categories. FIG. 6D shows the relative rankings of each financing structure based on the scores tallied for the financial factors and the non-financial factors. In this example, the financial scoring rank is as follows: Ownership-Debt (highest); Synthetic Lease; and Lease (lowest). In addition, the non-financial rank is as follows: Synthetic Lease (highest); Ownership-Debt; and Lease (lowest). Summing the weighted scores together, the financing structure that has the highest score is Ownership-Debt, thereby indicating that the Ownership-Debt financing structure is the optimal financing structure for the entity to utilize for this particular real estate asset.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for evaluating financing structures for procuring a real estate asset by an entity, the method comprising the steps of:
   inputting information into a computer for processing the information wherein the information comprises financial data and non-financial data relating to the real estate asset, at least one financial datum is a performance metric of the entity;
   providing a plurality of financing structures;
   processing the financial data and the non-financial data into indicator values representing the financial data and the non-financial data with the computer;
   evaluating the indicator values for the financial data and the non-financial data with respect to the plurality of financing structures;
   computing a total score for each financing structure with the computer based on the indicator values for the financial and the non-financial data;
   comparing the total scores of all financing structures and determining an optimal financing structure based on the comparison of the total scores with the computer;
   performing a sensitivity analysis on each financing structure with the computer; and
   outputting a report from the computer showing the optimal financing structure for procuring the real estate asset, said report further showing results of the sensitivity analysis performed on each financing structure.

2. The method of claim 1 further comprising the steps of:
   assigning and applying weights to the indicator values that represent the importance of the financial data and the non-financial data for each financing structure; and
   evaluating the weighted financial data and the non-financial data to get a total score of the financial data and the non-financial data for each financing structure.

3. The method of claim 1 wherein the financing structures comprise an ownership financing structure and a lease hold financing structure.

4. The method of claim 1 wherein the financing structure may be selected from the group consisting of: ownership using corporate funds, ownership with debt, a real estate investment trust, a partnership, and a joint venture.

5. The method of claim 1 wherein the financing structures may be selected from the group consisting of: a short term-lease, a long-term lease, a credit sale/leaseback, a tax motivated leverage lease, and a synthetic lease.

6. The method of claim 1 wherein the financing structures may be selected from the group consisting of: ownership using corporate funds, ownership with debt, a real estate investment trust, a partnership, a joint venture, a short-term lease, a long-term lease, a credit sale/leaseback, a tax-motivated leveraged lease, and a synthetic lease.

7. The method of claim 1 further comprising the step of:
   manipulating the financial data into performance metrics and assigning weights to the performance metrics to determine a financial data total, score.

8. The method of claim 1 wherein the financial data is selected from the group consisting of: a net present value after tax factor, an economic value-added factor, a total debt to capital factor, a capital requirement factor, a profit and loss ("P&L") cost impact factor, an earnings before interest and tax ("EBIT") interest coverage factor, an earnings before interest, tax, depreciation and amortization ("EBTIDA") interest coverage factor, a free cash flow to total debt factor, a funds from operations to total debt factor, a diluted earnings per share ("EPS") from continuing operations factor, an operating profit/net sales factor, a return on assets factor, a return on equity factor, and a return on total capital factor.

9. The method of claim 1 wherein the non-financial data is selected from the group consisting of: a strategic importance factor, a facility size factor, a replacement cost factor, a degree user specific factor, a market value/book value factor, a length of commitment factor, a certainty of occupancy factor, a flexibility factor, a market conformance factor, a size of market factor, a quality of market factor, and a rent/value trend factor.

10. The method of claim 1 wherein the information relates to financial data of the entity desiring to procure the real estate.

11. The method of claim 1 further comprising the step of:
    evaluating the entity desiring to procure the real estate asset and the real estate asset for the financial and the non-financial data.

12. The method of claim 1 further comprising the step of:
    evaluating the real estate asset and the entity desiring to procure the real estate asset; and
    designing a model that processes the financial and the non-financial information into indicator values.

13. The method of claim 1 wherein the evaluation of the entity comprises reviewing documentation of the entity and interviewing personnel from within the entity.

14. The method of claim 1 further comprising the step of:
    converting the financial information into standardized units prior to assigning the indicator values to the financial information.

15. A system for evaluating financial structures for procuring a real estate asset by an entity comprising:
    means for inputting information wherein the information comprises financial data and non-financial data relating to the real estate asset, at least one financial datum is a performance metric of the entity;
    a database comprising information relating to real estate financing structures;
    means for processing the financial data and the non-financial data into indicator values representing the financial data and the non-financial data;
    means for evaluating the indicator values for the financial data and the non-financial data with respect to the real estate financing structures;
    means for computing total scores for each real estate financing structure based on the indicator values for the financial and the non-financial data; and
    means for comparing the total scores for each real estate financing structure for determining an optimal financing structure based on the comparison of the total scores;
    means for performing a sensitivity analysis on each financing structure;
    means for outputting a report showing the optimal financing structure for procuring the real estate asset, said report further showing results of the sensitivity analysis performed on each financing structure.

16. The system of claim 15 further comprising:
means for assigning weights to the indicator values that represent the importance of the financial data and the non-financial data for each financing structure; and
means for evaluating the weighted financial data and the non-financial data to get a total score for the financial data and the non-financial data for each financing structure.

17. The system of claim 15 wherein the financing structures may be selected from the group consisting of: ownership using corporate funds, ownership with debt, a real estate investment trust, a partnership, a joint venture, a short-term lease, a long-term lease, a credit sale/leaseback, a tax-motivated leveraged lease, and a synthetic lease.

18. The system of claim 15 wherein the non-financial data is selected from the group consisting of: a strategic importance factor, a facility size factor, a replacement cost factor, a degree user specific factor, a market value/book value factor, a length of commitment factor, a certainty of occupancy factor, a flexibility factor, a market conformance factor, a size of market factor, a quality of market factor, and a rent/value trend factor.

* * * * *